United States Patent
Håkansson

(10) Patent No.: US 7,185,752 B2
(45) Date of Patent: Mar. 6, 2007

(54) APPARATUS FOR CONTINUOUSLY GROUPING ON A CONVEYOR

(75) Inventor: Jan Håkansson, Eslöv (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 41 days.

(21) Appl. No.: 10/485,220

(22) PCT Filed: May 30, 2002

(86) PCT No.: PCT/SE02/01032

§ 371 (c)(1),
(2), (4) Date: Sep. 16, 2004

(87) PCT Pub. No.: WO02/096786

PCT Pub. Date: Dec. 5, 2002

(65) Prior Publication Data

US 2005/0011729 A1    Jan. 20, 2005

(30) Foreign Application Priority Data

May 31, 2001 (SE) .................................... 0101914

(51) Int. Cl.
B65G 47/26 (2006.01)
(52) U.S. Cl. ................. 198/419.1; 198/419.2; 198/459.6; 198/459.7; 198/463.6; 198/461.2; 198/460.2; 198/588; 53/147
(58) Field of Classification Search ............ 198/419.1, 198/419.2, 459.6, 459.7, 463.6, 461.2, 460.2, 198/588; 53/147
See application file for complete search history.

(56) References Cited

U.S. PATENT DOCUMENTS

| 4,294,344 | A | | 10/1981 | Van Maanen | |
|---|---|---|---|---|---|
| 5,025,909 | A | * | 6/1991 | De Benedetti | 198/341.02 |
| 5,322,154 | A | * | 6/1994 | Lenherr | 198/460.2 |
| 6,305,525 | B1 | * | 10/2001 | Miller et al. | 198/460.2 |
| 6,321,896 | B1 | * | 11/2001 | Zuccheri et al. | 198/419.1 |
| 6,370,845 | B1 | * | 4/2002 | Kokkersvold et al. | 53/452 |
| 6,640,961 | B2 | * | 11/2003 | Cavallari | 198/460.2 |
| 6,766,628 | B2 | * | 7/2004 | Guidetti | 53/443 |

FOREIGN PATENT DOCUMENTS

| DE | 32 26 588 A1 | * | 11/1983 |
|---|---|---|---|
| DE | 35 46 248 A1 | * | 7/1987 |
| DE | 3546248 A1 | * | 7/1987 |

* cited by examiner

Primary Examiner—Gene O. Crawford
Assistant Examiner—Leslie A. Nicolson, III
(74) Attorney, Agent, or Firm—Buchanan, Ingersoll & Rooney PC

(57) ABSTRACT

An apparatus for continuously grouping or marshalling objects together on a conveyor includes the conveyor being divided into a first and a second conveyor section, where the second conveyor section has a higher speed than the first conveyor section. The conveyor sections have a common plane on which the objects are advanced. The conveyor sections each have two bending rollers in the common plane, each of which have a bending roller lying closely adjacent one another. Between the rollers placed adjacent one another is disposed an arrest member. The arrest member is movable through 90 degrees in relation to the common plane. The arrest member is moreover, together with the bending rollers, displaceable along the common plane.

17 Claims, 2 Drawing Sheets

Figure 1:
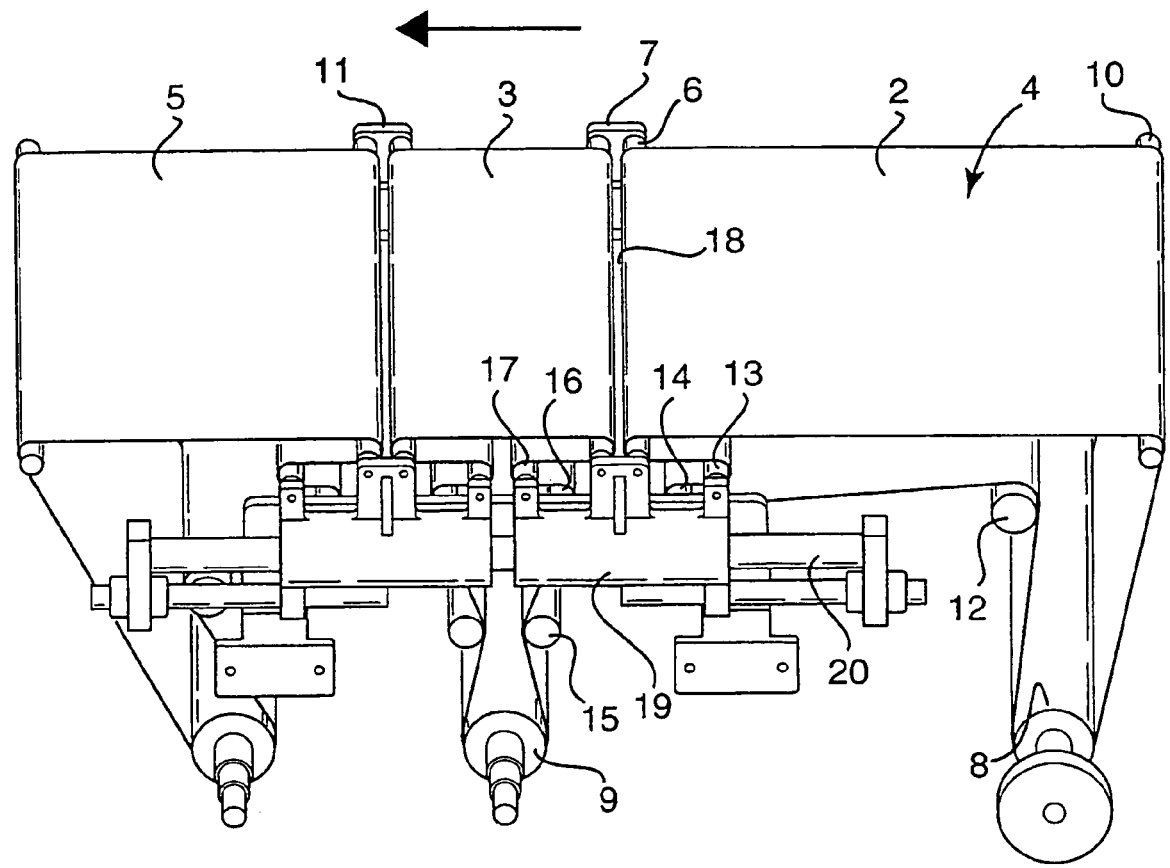

A.

B.

C.

D.

E.

APPARATUS FOR CONTINUOUSLY GROUPING ON A CONVEYOR

TECHNICAL FIELD

The present invention relates to an apparatus for continuously grouping or marshalling of objects on a conveyor, the conveyor being divided into a first and second conveyor section, with a common plane on which the objects are advanced, both conveyor sections each having two bending rollers in the common plane, of which each having a bending roller lying placed closely adjacent one another, and the second conveyor section running at a higher speed than the first conveyor section.

BACKGROUND ART

In the distribution of different objects, it is occasionally desirable to marshal or group together a given number of objects into a so-called distribution unit. The distribution unit may be held together in different ways; for example, the grouped or marshalled objects may be shrink-film wrapped, provided with a wrapping of paper or paperboard or be held together by other means as a unit. Also as regards the manufacture of single-use disposable packages for foods, there is often a need in the art, in particular for packages of smaller volumes, to marshal or group them together into distribution units.

The single-use disposable packages may be manufactured from a paper laminate or alternatively from plastic and may have various configurations. A commonly occurring package shape is the parallelepipedic configuration. The packages are manufactured in a filling machine from a running material web, where the material web is formed into a product tube, is filled with product and severed to form individual packaging containers which are thereafter finally formed. The finished packaging containers depart from the filling machine normally on a conventional conveyor belt.

There are many ways of marshalling or grouping together a given number of objects, such as packaging containers, before they are wrapped to form a distribution unit in a special machine. The commonest method is to cause a brake or an arrest device intermittently to release a predetermined number of objects from a long row of objects. The number of objects is normally monitored by photocells or the like.

With filling machines that have constantly increasing capacity for manufacturing single use packages, the demands on the equipment or the machines that handle the packages before distribution are also increasing. The same applies to those machines that manufacture distribution units, such as shrink-film wrapped units. In order to be able to increase capacity output, it is necessary that the packages reach these machines already pre-grouped into the number desired. The apparatuses that marshal or group together the objects, i.e. the packages, must operate continuously.

OBJECTS OF THE INVENTION

One object of the present invention is to realise an apparatus which groups a continuous row of objects advanced on a conveyor, without stopping the advancement of the objects during the grouping operation.

A further object of the present invention is to realise an exact and reliable grouping without employing monitoring, for example in the form of photocells or the like.

Solution

These and other objects have been attained according to the present invention 20 in that the apparatus of the type disclosed by way of introduction has been given the characterising features that, between the above-mentioned bending rollers placed adjacent one another, there is disposed an arrest member which is movable through 90° in relation to the common plane, and that the above-mentioned bending rollers, together with the arrest member, are displaceable along the common plane. Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings, in which:

FIG. 1 shows an apparatus according to the present invention; and

Figure 2:
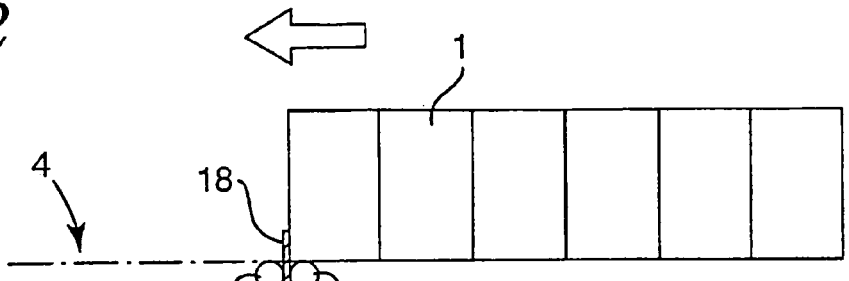
Figure 2:
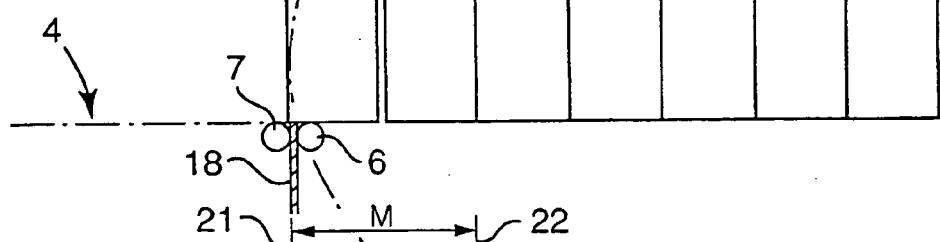
Figure 2:
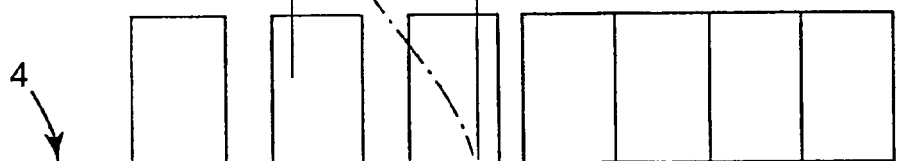
Figure 2:
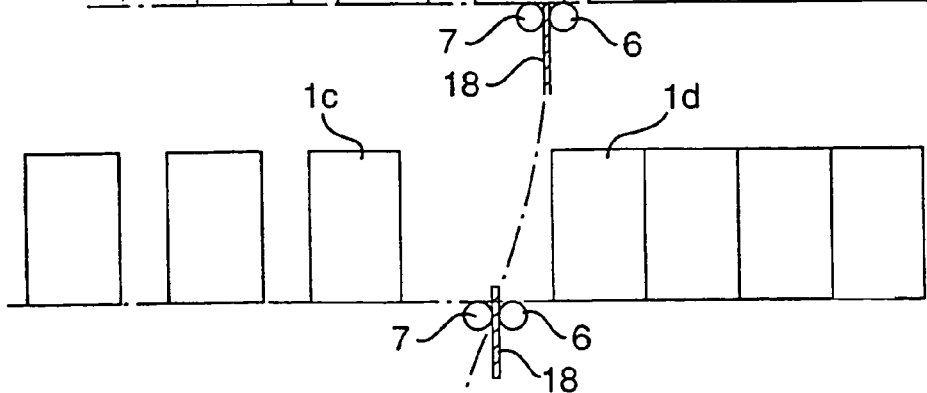
Figure 2:
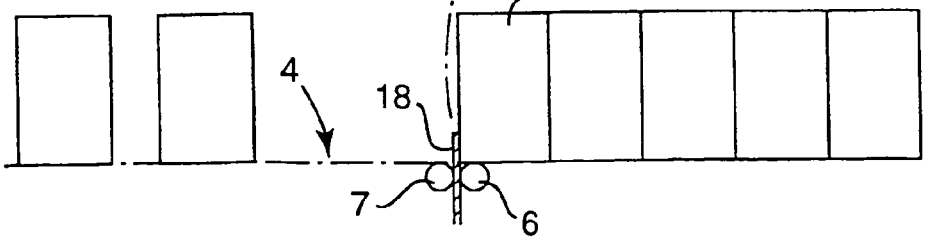

FIG. 2 schematically illustrates the function of the apparatus in steps A–E.

The Drawings show only those parts and details essential to an understanding of the present invention and the positioning of the apparatus in its context has been omitted.

DESCRIPTION OF PREFERRED EMBODIMENT

FIG. 1 shows the apparatus according to the present invention without objects 1 and where the positioning of the various parts is clearly apparent, while FIG. 2 schematically shows the function of the apparatus and how the objects 1 are marshalled or grouped into desired groups. The direction of movement of the objects 1 through the apparatus is indicated by arrows on the Drawings.

The apparatus includes a conveyor divided into a first 2 and a second 3 conveyor section. The conveyor sections 2, 3 consist of driven, endless belts or chains which have a common plane 4 on which the objects 1 are advanced. As is apparent from FIG. 1, the conveyor may be divided into further sections 5 if desired, or if needs arise for further grouping of handling of the objects 1. The following description encompasses the conveyor sections 2 and 3, but can correspondingly also apply to the section 5.

Each conveyor section 2, 3 has a bending roller 6, 7 placed closely adjacent one another in the common plane 4. The conveyor sections 2, 3 also have a driving roller 8, 9, which in the preferred embodiment, is placed under the common plane 4 of the conveyor sections 2, 3. The second conveyor section 3 in the direction of movement of the objects 1 is driven at a higher speed than the first conveyor section 2. The speed difference is at least 10% in the preferred embodiment. However, the speed difference must not be too great, which might cause objects 1 of a relatively high centre of gravity to topple over.

In the common plane 4, there are each additional bending rollers 10, 11. Under the common plane 4, each conveyor section 2, 3 displays additional bending rollers 12–17 whose function will be described below. The bending rollers 6, 7, 10, 11 which are placed in the common plane 4 are all of slight diameter in order to facilitate the transport of the objects 1 on the conveyor sections 2, 3. Alternatively, these bending rollers 6, 7, 10, 11 may be substituted by some form of bent rails.

Between the bending rollers 6, 7 placed adjacent one another, there is disposed an arrest member 18. The arrest member 18 is secured on a bracket 19 together with the bending rollers 6, 7. The bracket 19 is movably disposed on a rail or a guide 20 which is oriented parallel with the common plane 4. By means of a piston and cylinder assembly (not shown), the bracket 19 is movable along the common plane 4. The piston and cylinder assembly may be pneumatic or hydraulic. Alternatively, the movement of the bracket 19 may be guided by a servo motor or a cam curve. As a result of the movement of the bracket 19, the arrest member 18 moves between two end positions, a forward end position 21 (in the direction of movement of the objects 1) and a rear end position 22.

The arrest member 18 is moreover disposed to reciprocate through 90° in relation to the common plane 4. Thus, the arrest member may move between an upper end position where the arrest member 18 is located above the common plane 4 and a lower end position where the arrest member 18 is located under the common plane 4. The movement of the arrest member 18 is guided in the preferred embodiment by a piston and cylinder assembly which may be pneumatic or hydraulic. Alternatively, the movement of the arrest member 18 is guided by a cam curve.

Of the bending rollers which each conveyor section 2, 3 has positioned under the common plane 4, bending rollers 13, 14 and 16, 17 are secured on the same bracket 19 as the arrest member 18 and the bending rollers 6, 7 are secured on. As a result of the movement of the bracket 19 reciprocally along the common plane 4, the length of the conveyor sections 2, 3 is altered in the common plane 4. In that the above-disclosed bending rollers 13, 14 and 16, 17 accompany this movement, the change in length is compensated for.

FIG. 2 shows the function of the apparatus in a number of subdrawings A–E. In FIG. 2A, the apparatus is in the starting position. The arrest member 18 is located at its upper end position, i.e. it is located wholly above the common plane 4. Further, the arrest member 18 is located approximately centrally between the forward and rear end positions. In this position, the objects 1 form a queue behind the arrest member 18 and are held there by the arrest member 18 but without being obstructed in their forward movement.

In FIG. 2B, the arrest member 18, and thereby also the bending rollers 6, 7, have moved forward to the forward end position 21. At the same time, the arrest member 18 has moved downwards so that it is located in its lowermost end position at the same time as being located in its forward end position 21. The first object 1a will then move over to the second conveyor section 3. As a result of the higher speed of the second conveyor section 3, the first object 1a begins to accelerate and a small gap opens up between the first 1a and the second 1b objects.

In FIG. 2C, the arrest member 18 has, together with the bending rollers 6, 7, moved back until the arrest member 18 reaches its rear end position 22. The arrest member 18 is located, throughout the entire movement, in its lower end position under the common plane 4. During this movement, the number of objects 1 which it is desired will be grouped together has moved in onto the second conveyor section 3. The distance M between the forward end position 21 and the rear end position 22 must thus be varied depending upon how many objects 1 are to be grouped together.

FIG. 2D shows that moment when the arrest member 18 and the bending rollers 6, 7 once again move forward, at the same time as the arrest member 18 begins to move upwards. This entails that the gap between the last grouped object 1c and the next object 1d in the sequence widens. The increased gap provides the arrest member 18 with the opportunity to continue up to its upper end position without disturbing the objects 1 which are continuously transported on the two conveyor sections 2, 3.

FIG. 2E is identical with FIG. 2A. The arrest member 18 is in its upper end position and holds back the queue of objects 1. The movement cycle is now completed and can thereafter be re-started in accordance with the above description. The objects 1 constantly move forward in the direction of the arrow so that they are continuously grouped.

No photocells or other detectors are necessary for grouping objects 1 in the apparatus according to the present invention. The distance M which the arrest member 18 moves between its forward end position 21 and its rear end position 22 determines the number of objects 1 which are to be grouped together.

As will have been apparent from the foregoing description, the present invention realises an apparatus for the continuous grouping of objects which are advanced on a conveyor. The apparatus makes for rapid and reliable grouping together without the use of photocells or other detectors and without the objects being arrested in their movement on the conveyor.

What is claimed is:

1. An apparatus for continuously grouping or marshalling of objects, comprising:
    a conveyor on which the objects are adapted to be placed for advancement,
    the conveyor being divided into a first and second conveyor section, with a common plane on which the objects are advanced,
    both conveyor sections each having two bending rollers in the common plane, of which each having a bending roller lying placed closely adjacent one another,
    the second conveyor section running at a higher speed than the first conveyor section,
    an arrest member disposed between said bending rollers placed adjacent one another,
    the arrest member being movable through 90° in relation to the common plane; and
    means for displacing said bending rollers, together with the arrest member, along the common plane.

2. The apparatus as claimed in claim 1, wherein the speed of the second conveyor section is at least 10% higher than the speed of the first conveyor section.

3. The apparatus as claimed in claim 1, wherein the arrest member moves between an upper and a lower end position; and that the arrest member also moves between a forward end position and a rear end position.

4. The apparatus as claimed in claim 3, wherein the distance between the forward and the rear end positions determines the number of objects which are grouped together.

5. The apparatus as claimed in claim 1, wherein said arrest member and said bending rollers placed adjacent one another are secured to a common bracket.

6. The apparatus as claimed in claim 5, wherein the common bracket is movable along a guide positioned parallel with the common plane.

7. The apparatus as claimed in claim 1, wherein the first conveyor section is operated to advance the objects in an advancing direction, the bending rollers are together with the arrest member displaceable longitudinally in a direction opposite the advancing direction.

8. A method for continuously grouping or marshalling objects on a conveyor, the conveyor comprising: a first conveyor section and a second conveyor section positioned in a common plane on which the objects are placed, each of the first and second conveyor sections comprising two bending rollers in the common plane, one of the bending rollers of the first conveyor section and one of the bending rollers of the second conveyor section being positioned closely adjacent one another, the method comprising:

operating the first and second conveyor sections so that the second conveyor section is running at a higher speed than the first conveyor section, moving an arrest member disposed between the one bending roller of the first conveyor section and the one bending roller of the second conveyor section 90° in relation to the common plane, and moving the arrest member together with the one bending roller of the first conveyor section and the one bending roller of the second conveyor section along the common plane.

9. The method as claimed in claim 8, wherein the movement of the arrest member 90° in relation to the common plane comprises moving the arrest member from an upper position in which the arrest member blocks objects on the first conveyor section from being advanced to the second conveyor section to a lower position in which the arrest member permits the objects on the first conveyor section to be advanced to the second conveyor section.

10. The method as claimed in claim 9, wherein the movement of the arrest member together with the one bending roller of the first conveyor section and the one bending roller of the second conveyor section along the common plane comprises the arrest member moving together with the one bending roller of the first conveyor section and the one bending roller of the second conveyor section in a direction in which the objects are advanced.

11. The method as claimed in claim 10, wherein following movement of the arrest member together with the one bending roller of the first conveyor section and the one bending roller of the second conveyor section in the direction in which the objects are advanced, the arrest member moves together with the one bending roller of the first conveyor section and the one bending roller of the second conveyor section along the common plane in a direction opposite to the direction in which the objects are advanced.

12. The method as claimed in claim 8, wherein the movement of the arrest member together with the one bending roller of the first conveyor section and the one bending roller of the second conveyor section along the common plane comprises the arrest member moving together with the one bending roller of the first conveyor section and the one bending roller of the second conveyor section in a direction which the objects are advanced.

13. The method as claimed in claim 12, wherein following movement of the arrest member together with the one bending roller of the first conveyor section and the one bending roller of the second conveyor section in the direction in which the objects are advanced, the arrest member moves together with the one bending roller of the first conveyor section and the one bending roller of the second conveyor section along the common plane in a direction opposite to the direction in which the objects are advanced.

14. The method as claimed in claim 8, wherein the second conveyor section is moved at a speed at least 10% higher than the speed of the first conveyor section.

15. The method as claimed in claim 8, wherein the movement of the arrest member 90° in relation to the common plane comprises the arrest member moving between an upper end position and a lower end position; and the movement of the arrest member together with the one bending roller of the first conveyor section and the one bending roller of the second conveyor section comprises moving the arrest member together with the one bending roller of the first conveyor section and the one bending roller of the second conveyor section between a forward end position and a rear end position.

16. The method as claimed in claim 15, wherein a distance between the forward end position and the rear end position determines the number of objects which are grouped together.

17. An apparatus for continuously grouping or marshalling of objects, comprising:

a conveyor on which the objects are adapted to be placed for advancement, the conveyor being divided into a first and second conveyor section, with a common plane on which the objects are advanced, both conveyor sections each having two bending rollers in the common plane, of which each having a bending roller lying placed closely adjacent one another, the second conveyor section running at a higher speed than the first conveyor section, an arrest member disposed between said bending rollers placed adjacent one another, the arrest member being movable through 90° in relation to the common plane, said bending rollers are, together with the arrest member, displaceable along the common plane, wherein said arrest member and said bending rollers placed adjacent one another are secured to a common bracket, and wherein the common bracket is movable along a guide positioned parallel with the common plane.

* * * * *